(12) United States Patent
Solomon et al.

(10) Patent No.: US 7,825,913 B2
(45) Date of Patent: Nov. 2, 2010

(54) COMPUTER STYLUS WITH INTEGRATED MEMORY

(75) Inventors: Mark C. Solomon, Corvallis, OR (US); Brad Hodson, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 947 days.

(21) Appl. No.: 11/700,204

(22) Filed: Jan. 30, 2007

(65) Prior Publication Data

US 2008/0180411 A1 Jul. 31, 2008

(51) Int. Cl.
*G06F 3/033* (2006.01)
(52) U.S. Cl. ...................................................... 345/179
(58) Field of Classification Search .................. 345/179
See application file for complete search history.

(56) References Cited

U.S. PATENT DOCUMENTS

| 6,195,446 | B1 * | 2/2001 | Skoog ......................... 382/119 |
| 6,262,719 | B1 | 7/2001 | Bi |
| 6,563,494 | B1 * | 5/2003 | Eichstaedt et al. .......... 345/179 |
| 6,781,578 | B2 | 8/2004 | Sharma |
| 7,347,638 | B1 * | 3/2008 | Lin ............................. 401/195 |
| 7,627,703 | B2 * | 12/2009 | Oliver .......................... 710/72 |
| 2004/0080989 | A1 * | 4/2004 | Yu .............................. 365/200 |
| 2006/0149895 | A1 | 7/2006 | Pocrass |
| 2006/0197755 | A1 * | 9/2006 | Bawany ....................... 345/179 |
| 2006/0202976 | A1 * | 9/2006 | Perkins et al. .............. 345/179 |
| 2006/0250380 | A1 | 11/2006 | Oliver |

* cited by examiner

*Primary Examiner*—Quan-Zhen Wang
*Assistant Examiner*—Sahlu Okebato

(57) ABSTRACT

A computer stylus comprises at least one memory element for storing data therein.

14 Claims, 2 Drawing Sheets

COMPUTER STYLUS WITH INTEGRATED MEMORY

BACKGROUND

The portability of computer, electronic and/or other related types of devices generally results in a user having to transport numerous items. For example, it is not uncommon for a user to transport a computer device (e.g., a tablet computer or convertible notebook computer), a personal digital assistant (PDA) or other type of electronic mail/calendar device, a stylus for use with either the computer device or PDA, a portable telephone, a spare battery, a power adapter, a battery charger, etc. Thus, users find transporting the many types of devices cumbersome, and many of such devices are lost or misplaced.

DETAILED DESCRIPTION OF THE DRAWINGS

Figure 1:
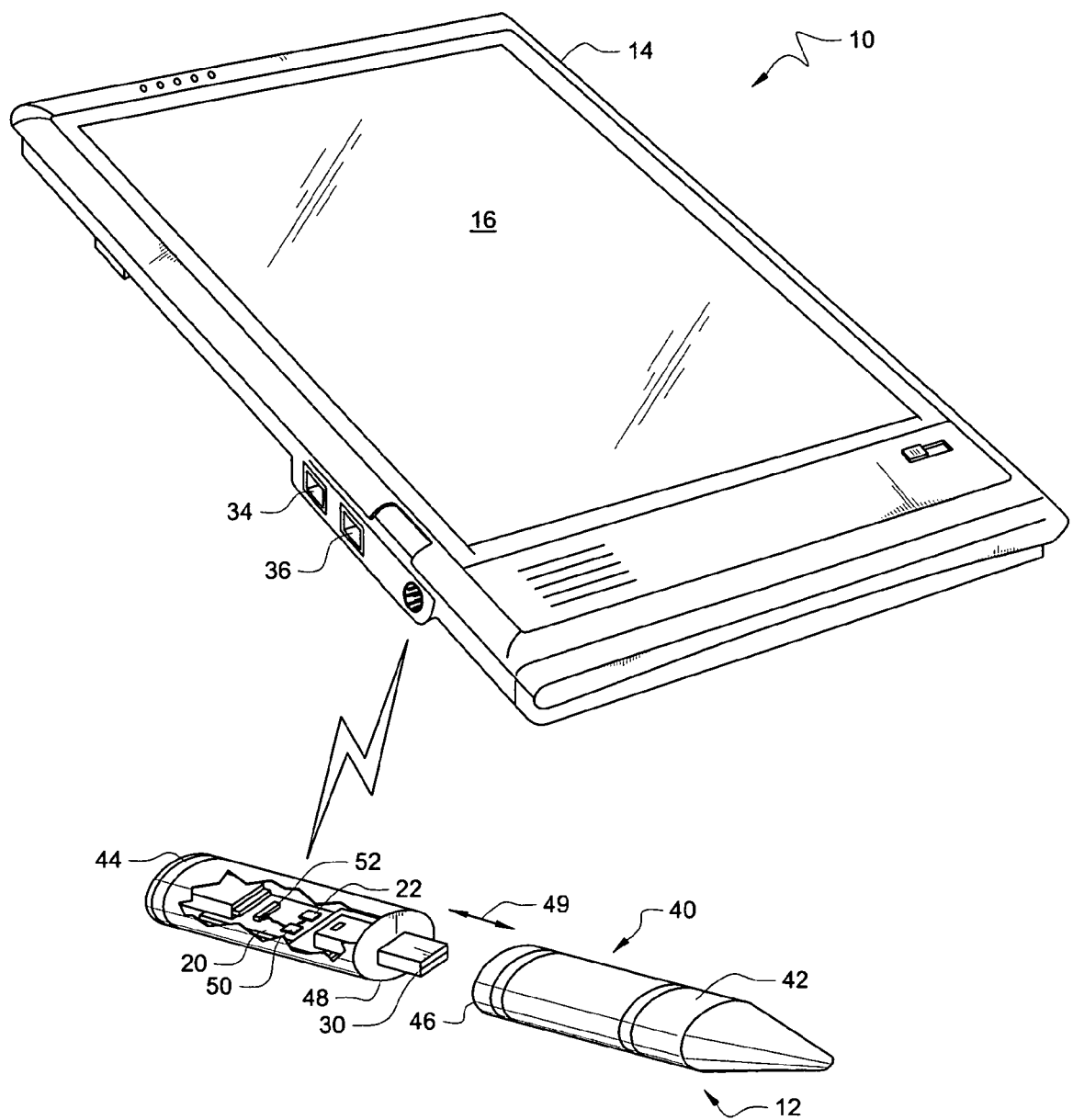
FIG. 1 is a diagram illustrating an embodiment of a computer system in which an embodiment of a computer stylus with integrated memory is employed to advantage.

FIG. 1 is a diagram illustrating a computer system 10 in which an embodiment of a computer stylus 12 is employed to advantage. In the embodiment illustrated in FIG. 1, computer system 10 comprises a computing device 14 configured to cooperate with stylus 12 for receiving input therefrom. For example, in the embodiment illustrated in FIG. 1, computing device 14 comprises a display element 16 configured to receive and/or otherwise record input from stylus 12. Stylus 12 and/or computing device 14 may be configured to communicate in order for computing device 14 to receive such input via pressure sensitive means, radio frequency means, or otherwise. Computing device 14 may comprise any type of computing device configured to receive input via stylus 12 such as, but not limited to, a tablet computer, a convertible notebook or laptop computer, a personal digital assistant (PDA), and a gaming device. As used herein, a "computer stylus" shall mean any type of device for interacting with display element 16 for providing input thereto such as a computer pen or other type of digitizer device.

In the embodiment illustrated in FIG. 1, stylus 12 comprises at least one printed circuit board 20 having at least one memory element 22 disposed thereon for storing data. Memory element 22 may comprise an integrated circuit or chip having flash memory or any other type of memory structure for storing data. In the embodiment illustrated in FIG. 1, stylus 12 also comprises a connector element 30 communicatively coupled to printed circuit board 20 and/or memory element 22 for physically and communicatively coupling at least a portion of stylus 12 to computing device 14. For example, in the embodiment illustrated in FIG. 1, computing device 14 comprises one or more input/output (I/O) ports 34 and 36. Stylus 12 and/or computing device 14 are preferably configured to facilitate physical coupling of stylus 12 to computing device 14 to facilitate transfer of data between stylus 12 and computing device 14. For example, in some embodiments, connector element 30 comprises a universal serial bus (USB) connector element for communicatively engaging a corresponding USB port 34 and/or 36 disposed on computing device 14. Thus, in operation, connector element 30 is configured to be inserted into and/or otherwise engage I/O ports 34 and/or 36 to facilitate data transfer from stylus 12 to computing device 14 and/or from computing device 14 to stylus 12. However, it should be understood that other types of connector devices and/or communication protocols may be used for physically and communicatively coupling stylus 12 to computing device 14 to facilitate data transfer between computer stylus 12 and computing device 14.

In the embodiment illustrated in FIG. 1, stylus 12 comprises a housing 40 having a portion 42 configured to be releaseably and/or detachably coupled to a portion 44. For example, in some embodiments, portion 42 comprises an end 46 configured to be detachably coupleable to an end 48 of portion 44. In the embodiment illustrated in FIG. 1, connector element 30 is disposed at and/or otherwise extends from end 48 of portion 44 such that connector element 30 is slideably insertable into end 46 of portion 42. Thus, in operation, portions 42 and 44 are separable and/or detachable from each other to expose connector element 30 and facilitate coupling of connector element 30 to computing device 14 (e.g., using I/O ports 34 and/or 36). Thus, as illustrated in FIG. 1, housing portions 42 and 44 are movable relative to each other in the directions indicated by arrow 49 to either detach housing portion 42 from housing portion 44 (e.g., to expose connector element 30) or connect housing portion 42 to housing portion 44 (e.g., to dispose and/or otherwise conceal connector element 30 within housing portion 42).

In the embodiment illustrated in FIG. 1, stylus 12 comprises a wireless or radio module 50 and an antennae 52 disposed on printed circuit board 20. In the embodiment illustrated in FIG. 1, stylus 12 is configured to facilitate wireless transfer of data between stylus 12 and computing device 14. For example, in some embodiments, module 50 is configured to wirelessly transmit data from memory element 22 to computing device 14 and/or receive data from computing device 14 via a wireless communication (e.g., via a wireless I/O port 54 disposed on computing device 14, an internally disposed antenna of computing device 14, etc.). Data transfer may be initiated in response to actuation of one or more input/output elements disposed on computing device 14 and/or stylus 12 such as, but not limited to, a button, switch, graphical icon or element, etc. In the embodiment illustrated in FIG. 1, stylus 12 is configured having elements to facilitate both wireless transfer of data and physical coupling of stylus 12 to computing device 14 to facilitate transfer of data. However, it should be understood that stylus 12 may be differently configured. For example, in some embodiments, stylus 12 may be configured without connector element 30 such that separable housing portions are unnecessary (e.g., using only wireless communication means for transferring data between stylus 12 and computing device 14). Further, for example, in some embodiments, stylus 12 may be configured without wireless capability such that data transfer between stylus 12 and computing device 14 is accomplished based on a physical coupling of stylus 12 to computing device 14. Thus, it should be understood that stylus 12 may be configured with various features and/or combinations of features.

Figure 2:
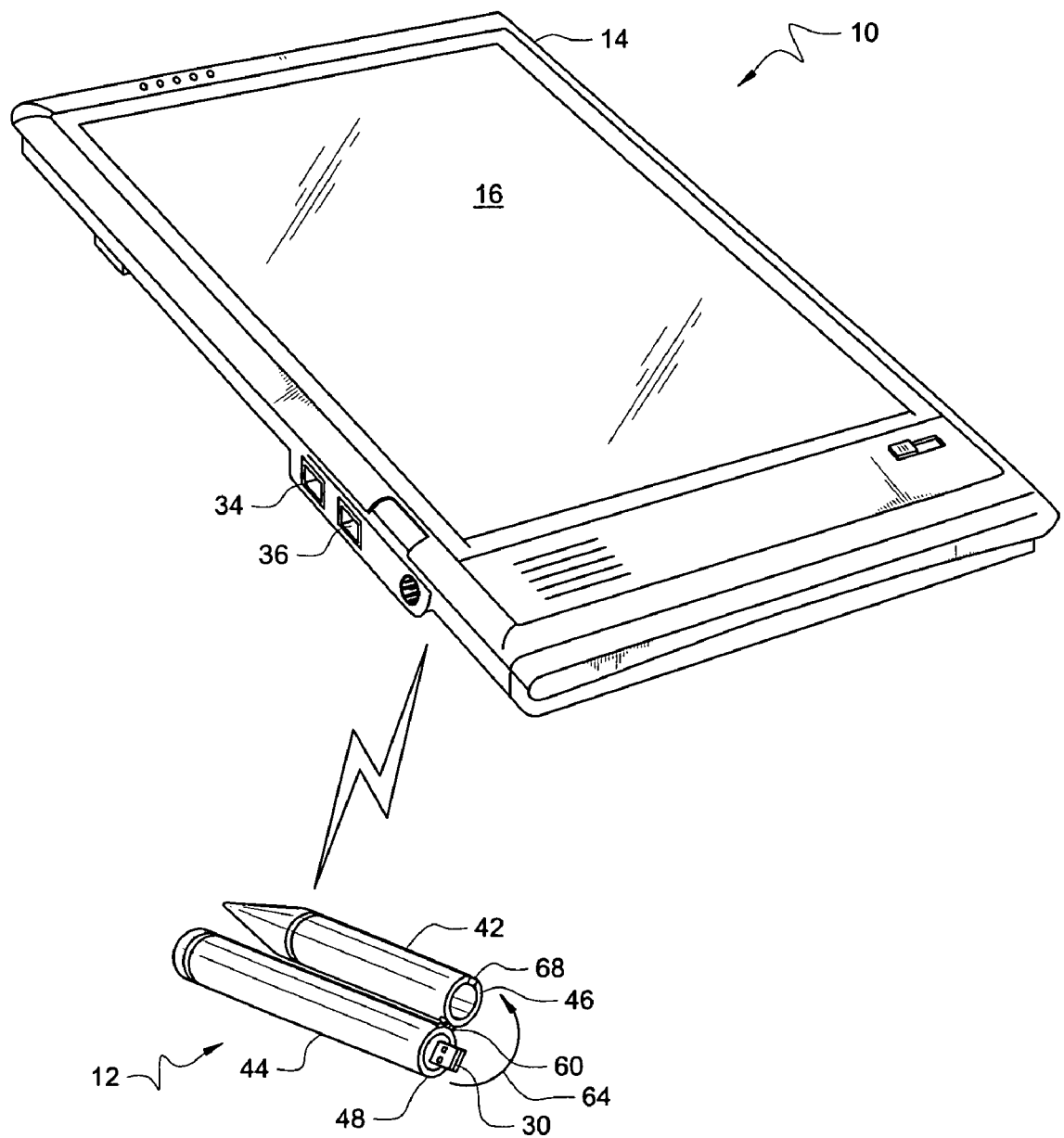
FIG. 2 is a diagram illustrating another embodiment of a computer stylus with integrated memory.

FIG. 2 is a diagram illustrating another embodiment of stylus 12. In the embodiment illustrated in FIG. 2, stylus 12 comprises a hinge element 60 for rotatably coupling housing portion 42 to housing portion 44. As illustrated in FIG. 2, end 46 of housing portion 42 is separable from end 48 of housing portion 44 by rotating housing portion 42 in the direction indicated by arrow 64 relative to housing portion 44, thereby exposing connector element 30 to facilitate physical coupling of connector element 30 to at least one of I/O ports 34 and/or 36. In the embodiment illustrated in FIG. 2, housing portion 42 comprises a slot 68 formed in housing portion 42 to facilitate opening and closing of housing portion 42 relative to housing portion 44. For example, in operation, slot 68 facilitates movement of end 46 relative to end 48 such that at least a portion of connector element 30 passes through at least a portion of slot 68. However, it should be understood that housing portions 42 and 44 may be otherwise configured.

Thus, embodiments of stylus 12 are configured having an integrated memory element for storing data while also enabling use of stylus 12 for providing input to a computing device display element, thereby obviating a need for a user to carry or transport a separate device for storing data. Further, embodiments of stylus 12 may be manufactured and/or otherwise configured having various modes of data transfer capability (e.g., via a wireless connection and/or via a physical coupling).

What is claimed is:

1. A computer stylus, comprising:
at least one memory element for storing data therein;
a first housing portion containing the at least one memory element;
a connector element extending from the first housing to facilitate physical communicative coupling of the at least one memory element to a computing device; and
a second housing portion including a pointed stylus tip for interacting with the computing device, the second housing portion being removably coupled to and separable from the first housing portion such that when the first housing portion and the second housing portion are separated, the pointed stylus tip may interact with computing device while the least one memory element is physically connected to the computing device by the connector element.

2. The computer stylus of claim 1, wherein the connector element is insertable into at least one input/output port of a computing device.

3. The computer stylus of claim 1, further comprising at least one element configured to facilitate a wireless transfer of the data between the computer stylus and a computing device.

4. The computer stylus of claim 1, wherein the second housing portion receives and encloses the connector element when connected to the first housing portion.

5. The computer stylus of claim 1, wherein the connector element is slideably insertable into the second housing portion of the computer stylus.

6. A method for manufacturing a computer stylus, comprising: providing a memory element configured for storing data therein; and providing a connector element configured to facilitate physical communicative coupling of the computer stylus to a computing device; wherein the method further comprising: providing a first housing portion containing the memory element and supporting the connector element; providing a second housing portion including a pointed stylus tip at a first end for interacting with the computing device, the second housing portion being removably coupled to and separable from the first housing portion; inserting the connector element into the computing device to physically communicatively couple the memory element to the computing device; transferring data between the memory element and the computing device; positioning the pointed stylus tip against the computing device to interact with the computing device while the connector element is inserted into the computing device.

7. The method of claim 6, further comprising providing at least one element configured to facilitate a wireless transfer of the data between the computer stylus and a computing device.

8. The method of claim 6, further comprising inserting the connector element into at least one input/output port of a computing device.

9. The method of claim 6, further comprising rotatably coupling the first housing portion to the second housing portion.

10. The method of claim 6, further comprising slideably inserting the connector element into a second end of the second housing portion of the computer stylus.

11. The computer stylus of claim 5, wherein the connector element is linearly slidable into the second housing portion of the computer stylus.

12. The method of claim 10, wherein inserting the connector element into the second end of the second housing portion comprises slidably inserting the connector element into the second end of the second housing portion.

13. The method of claim 12, wherein the connector element is linearly slid into the second end of the second housing portion.

14. A computer stylus, comprising:
at least one memory element for storing data therein;
a first housing portion separable from a second housing portion to expose a connector element for coupling the computer stylus to a computing device; and
a hinge element rotatably coupling the first housing portion to the second housing portion.

* * * * *